(12) United States Patent
Amano et al.

(10) Patent No.: US 8,757,527 B2
(45) Date of Patent: Jun. 24, 2014

(54) RAW MATERIAL SUPPLY APPARATUS AND GRINDING SYSTEM USING THE SAME

(75) Inventors: Motonari Amano, Ishikawa (JP); Toru Awazu, Ishikawa (JP); Masahiro Yoshida, Ishikawa (JP)

(73) Assignee: Takai Tofu & Soymilk Equipment Co., Ishikawa-gun, Ishikawa (JP)

( * ) Notice: Subject to any disclaimer, the term of this patent is extended or adjusted under 35 U.S.C. 154(b) by 694 days.

(21) Appl. No.: 12/735,724

(22) PCT Filed: Feb. 15, 2008

(86) PCT No.: PCT/JP2008/052573
§ 371 (c)(1),
(2), (4) Date: Dec. 28, 2010

(87) PCT Pub. No.: WO2009/101705
PCT Pub. Date: Aug. 20, 2009

(65) Prior Publication Data
US 2011/0089274 A1 Apr. 21, 2011

(51) Int. Cl.
*B02C 23/36* (2006.01)

(52) U.S. Cl.
USPC .......................... 241/46.06; 241/224; 241/248

(58) Field of Classification Search
USPC ............... 241/46.017, 46.02, 46.06, 248, 224
See application file for complete search history.

(56) References Cited

FOREIGN PATENT DOCUMENTS

| JP | H07-144140 A | 6/1995 |
|---|---|---|
| JP | 2005-304474 A | 11/2005 |
| JP | 2006-15206 A | 1/2006 |
| JP | 2007-69206 A | 3/2007 |

*Primary Examiner* — Mark Rosenbaum
(74) *Attorney, Agent, or Firm* — Manabu Kanesaka

(57) ABSTRACT

The apparatus is characterized by having a tubular member (4) in vertical posture; quantitative discharge means (7) capable of feeding out a solid raw material (6) at a constant rate, disposed inferiorly to the tubular member (4); and altitude control means (10) for control of the altitude of a liquid raw material (8), so that quantitative discharge is effected by placing the solid raw material (6) and the liquid raw material (8) in the tubular member (4) and, while controlling the altitude of the liquid raw material (8), feeding the mixture to the quantitative discharge means (7) by the own weight of the solid raw material (6).

11 Claims, 9 Drawing Sheets

RAW MATERIAL SUPPLY APPARATUS AND GRINDING SYSTEM USING THE SAME

FIELD OF THE INVENTION

The present invention relates to a raw material supply apparatus into which a solid raw material and a liquid raw material are introduced and supplied and from which a mixture of the raw materials is discharged.

BACKGROUND ART

Soymilk, for example, is produced from a go-eki having soybeans ground together with water. In producing the soymilk, a hopper (raw material supply apparatus) for supplying the soybeans and water is used. As the conventional hopper (raw material supply apparatus) of this type, the hopper disclosed in patent document 1 as JP H07-144140 A or patent document 2 as JP 2005-304474 A, for example, has been used.

On the other hand, the applicant of the present application has already proposed an apparatus for crushing and grinding solid raw materials including cereals or medicinal raw materials with a submerged grinding apparatus as disclosed in patent documents 3 as JP 2006-15206 A and patent documents 4 as JP 2007-69206 A, in which a hopper (raw material supply apparatus) is exemplified (in FIGS. 15 to 18 of patent document 3, for example).

DISCLOSURE OF THE INVENTION

Problems the Invention Intends to Solve

In the aforementioned conventional hopper (raw material supply apparatus), however, a problematic phenomenon in which the raw material forms a bridge at the discharge spout of the hopper (bridge phenomenon) occurs to make it difficult to quantitatively discharge the raw material. The problematic bridge phenomenon is more likely to occur particularly in the case where a solid raw material added with water is supplied, i.e. where dehulled coarsely crushed soybeans are supplied in a state in which the soybeans are soaked in water, for example. When the dehulled coarsely crushed solid raw material has been soaked in liquid raw material, the components eluted from the solid material increase their adhesiveness due to the surface tension of water, adhere to the inner walls of a tank or pipe and a measuring apparatus and, therefore, are difficult to handle. For example, since soybeans contain components including protein, fat and saccharide and various enzymes, when crushed soybeans have been added with water, the components are dissolved in the water and increase their adhesiveness and, consequently are difficult to handle. For this reason, the conventional devisal for easily handling the raw material as much as possible comprises weighing the raw material before assuming the aforementioned state and dispersing the weighed raw material in plenty of water. Since materials having soybean components eluted therefrom, like soaked soybeans, when having been dispersed in water, cannot be maintained uniformly in almost all cases, a batch processing treatment has been adopted by necessity in a process per se.

In addition, when it is intended to quantitatively take out the soybeans in a state of being soaked in water (including those crushed), there is a case where it is necessary to take out only the soybeans to be discharged (including those crushed) while maintaining the state of being soaked in water and, in this case, it is impossible to perform how to take out the soybeans in such a way with the aforementioned conventional hopper (raw material supply apparatus). Furthermore, the go-eki having the soybean components dissolved in water problematically generate with ease bubbles with which the space from the grinding apparatus to the hopper (raw material supply apparatus) is filled. Incidentally, in the state in which the solid raw material is soaked in the liquid raw material in an appropriate ratio, when only the hopper (raw material supply apparatus) has been used to supply the solid and liquid raw materials, since the hopper can easily be connected to a grinding apparatus or other such an apparatus insofar as the solid raw material can only be send out quantitatively or crushed, it has been demanded to provide an apparatus having such a simple structure.

In view of the above, the object of the present invention is to provide a raw material supply method, a method of quantitatively supplying the raw material and a grinding system using each of these methods, capable of quantitatively discharging the raw materials without inducing a bridge phenomenon while maintaining the state in which the solid raw material is soaked in the liquid raw material at an appropriate ratio, avoiding the influence of the bubbles when sending the raw materials to a grinding apparatus performing the subsequent step and producing a go-eki only with the apparatus.

Means for Solving the Problems

The present invention provides a raw material supply method comprising introducing and supplying a solid raw material together with a liquid raw material into a tubular member retained in a vertical posture while maintaining a level of the liquid raw material to allow the solid raw material to pass through the tubular member so as to exert its own weight downward and sending the solid raw material to quantitative discharge means disposed below the tubular member to quantitatively discharge the solid raw material. The present invention also provides a raw material supply apparatus, in which a solid raw material and a liquid raw material are introduced and supplied thereinto and discharged from a lower side thereof, comprising a tubular member which is retained in a vertical posture and into which the solid raw material and liquid raw material are introduced, quantitative discharge means disposed below the tubular member for sending out the solid raw material by a constant amount each time and level control means for controlling a level of the liquid raw material, whereby the solid raw material is sent to the quantitative discharge means by its own weight while maintaining the level of the liquid raw material to quantitatively discharge the solid raw material.

Here, the quantitative discharge means can be connected directly to any other apparatus. In producing a go-eki, it is preferably connected directly to a grinding apparatus or submerged grinding apparatus or, after being received once on a hopper, connected to the grinding apparatus or submerged grinding apparatus. In addition, as the quantitative discharge means, a self-suction quantitative pump for discharging the solid raw material little by little is preferably used. To be specific, a positive displacement pump, such as rotary pumps, MONO pumps, gear pumps, vane pumps, MONOFLEX pumps, hose pumps (tubing pumps) and plunger pumps, is preferred.

By supplying the solid raw material soaked in the liquid raw material into the raw material supply apparatus of the present invention, the tubular member functions so as to form the solid raw material into a columnar body to have its own weight effectively exerted downward. That is to say, the solid raw material is formed into the columnar body without allowing it to float on the liquid raw material while maintaining an appropriate state in which the solid raw material is soaked in the liquid raw material through level control, thereby eliminating occurrence of the conventional bridge phenomenon. As a result, the solid raw material is pushed with appropriate force in the quantitative discharge means disposed below the tubular member and, after being supplied to the quantitative discharge means, is always sent out in a constant amount each time from the quantitative discharge means. Though the solid raw material thus sent out allows the liquid raw material to adhere thereto, it is maintained in a state in which no excessive amount of liquid raw material adheres thereto. Incidentally, the pressure under which the solid raw material is pushed in the quantitative discharge means is determined by the difference in specific gravity between the solid raw material and the liquid raw material and through adjustment of the height of the solid raw material to be higher than the level of the liquid raw material and, when the height of the solid raw material has been higher than the level of the liquid raw material, the solid and liquid raw materials are supplied while achieving proper balance between the solid and liquid raw materials.

In the present invention, it is preferred that the grinding apparatus or submerged grinding apparatus is disposed below the quantitative discharge means and that the discharge spout of the quantitative discharge means is connected to the supply port of the grinding apparatus or submerged grinding apparatus.

According to the present invention, the solid raw material is ground and, in the case of the submerged grinding apparatus, the solid raw material not containing any excessive amount of the liquid raw material is supplied and ground as mixed with a sufficient amount of water (grinding water) during the submerged grinding operation. For this reason, since the ground solid raw material does not come into contact with air (oxygen), deterioration in quality thereof by the oxidation reaction can be avoided. Here, in particular, by disposing a tapered cylindrical discharge spout made of a flexible material, such as silicone rubber (silicone resin), below the quantitative discharge means, even liquid ready to generate bubbles, such as a go-eki, can quantitatively be supplied to a device for a subsequent step in the grinding apparatus while suppressing the generation of the bubbles and the occurrence of the phenomenon in which air (oxygen) is entrained in the solid raw material. Incidentally, as the flexible material, any member including a piece of bleached cotton cloth and a rat prevention plate made of wire can be used.

Incidentally, a step of pulverizing the solid raw material is provided as the subsequent step in the grinding apparatus to enable the go-eki to be produced only with the raw material supply apparatus.

Effects of the Invention

According to the present invention, since the solid raw material is sent to the quantitative discharge means while controlling the level of the liquid raw material, it is possible to discharge, with the quantitative discharge means, the solid raw material as soaked appropriately in the liquid raw material by a constant amount each time without inducing the bridge phenomenon of the solid raw material and without allowing the solid raw material to float on the liquid raw material in the presence of a large amount of the liquid raw material. In addition, in the case of connecting the quantitative discharge means to the submerged grinding apparatus, the quantitative discharge means can serve also as a measuring apparatus and have a stream adjustment function to suppress the running cost, does not necessitate the use of a vibration device and can effectively grind the solid raw material into a slurry state. Furthermore, particularly in producing a go-eki, by providing step of pulverizing the solid raw material is provided as the subsequent step with the quantitative discharge means, it is also possible to produce a go-eki only with the raw material supply apparatus.

DETAILED DESCRIPTION OF THE INVENTION

The raw material supply method, raw material supply apparatus and grinding system using the raw material supply apparatus will be described hereinafter in detail with reference to the drawings.

(Raw Material Supply Apparatus)

Figure 1A:
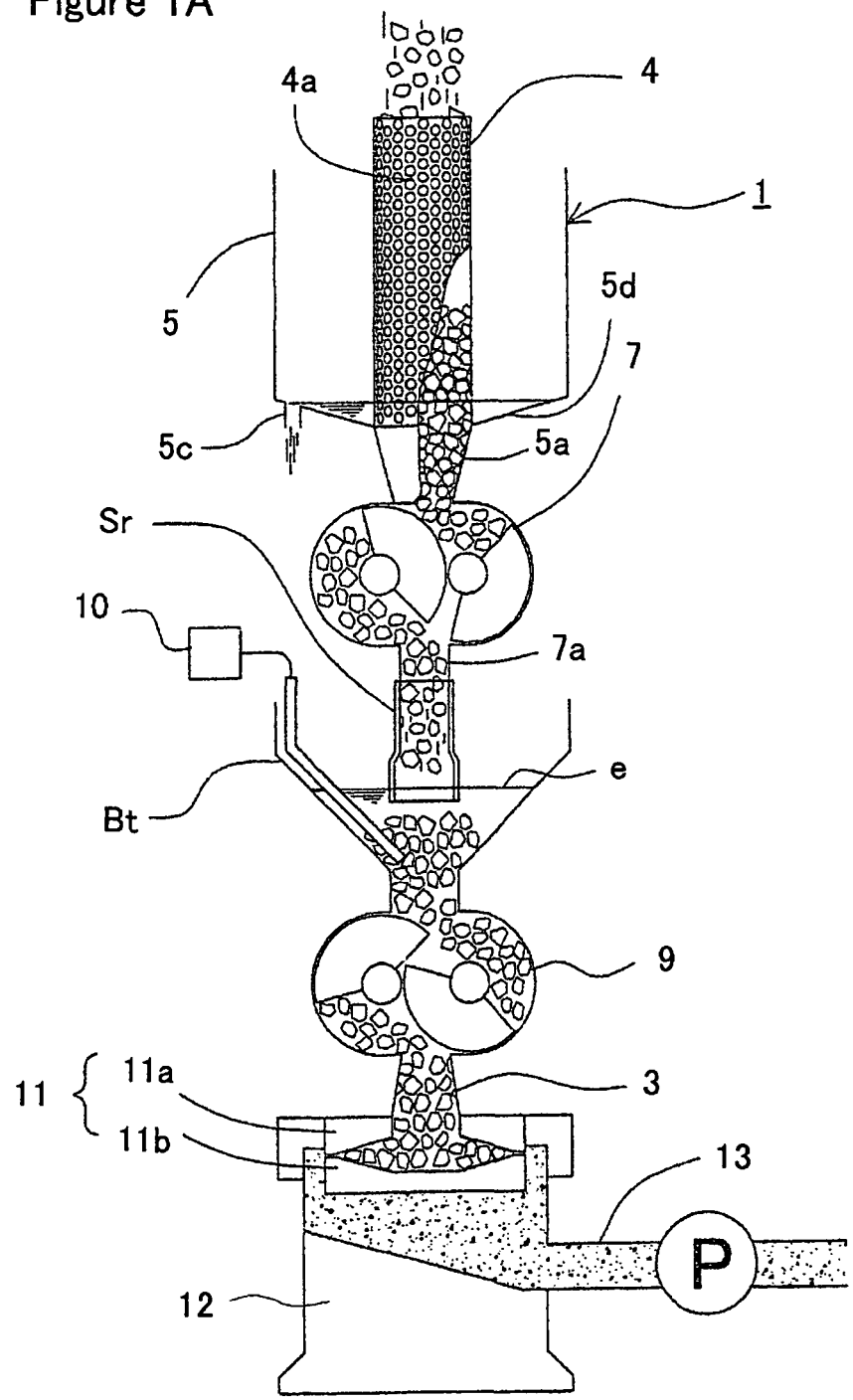
FIG. 1A is a schematic view showing first example of a raw material supply apparatus and that of a submerged grinding apparatus equipped with the raw-material supply apparatus.
Figure 1B:
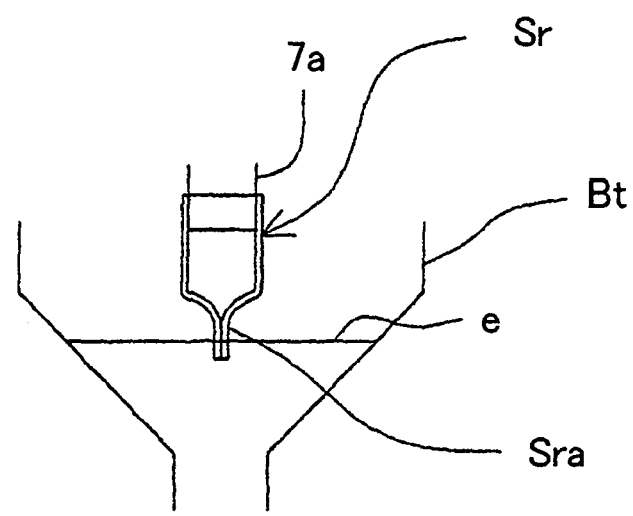
FIG. 1B is a schematic view showing a second hopper of the raw material supply apparatus.
Figure 2:
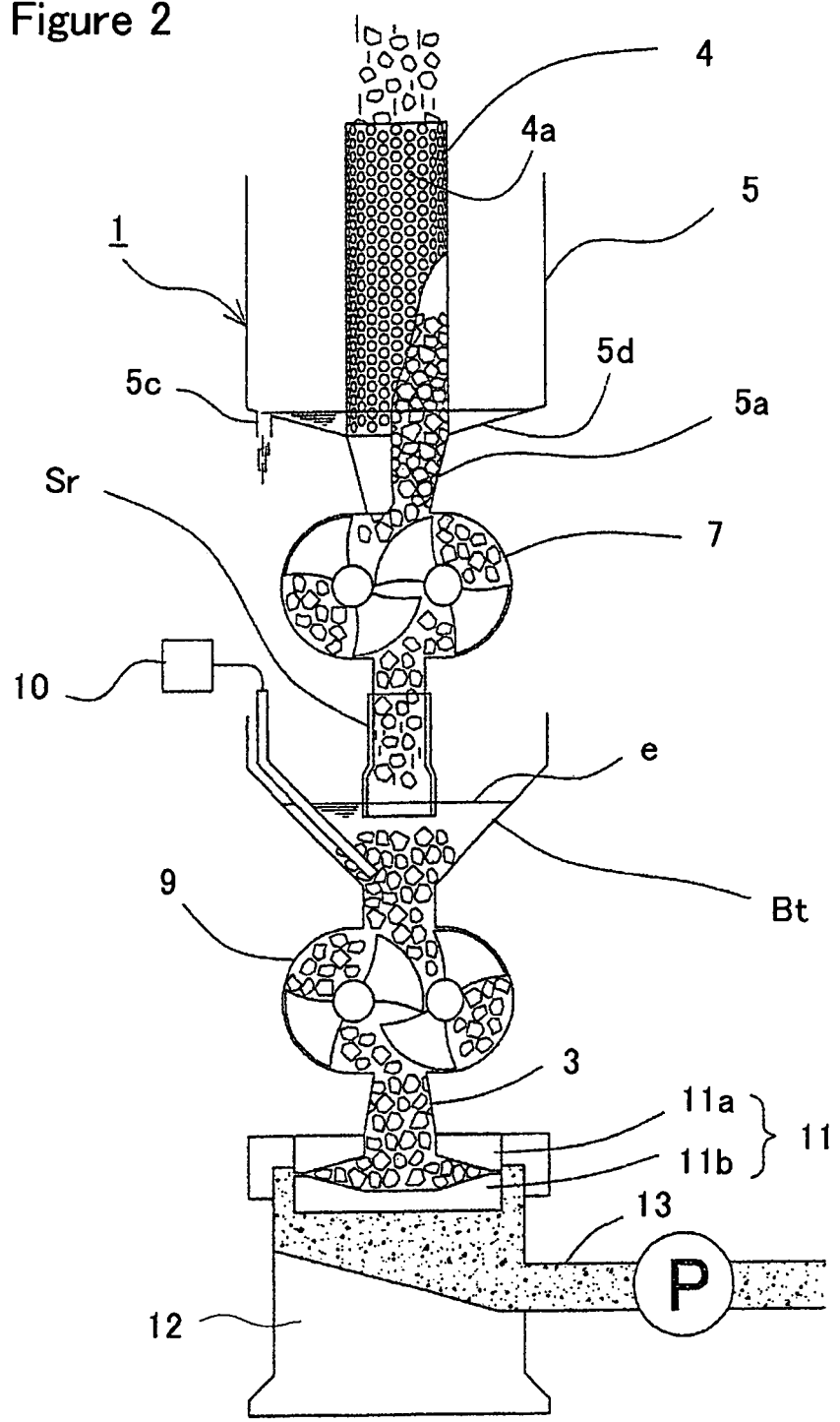
FIG. 2 is a schematic view showing second example of the raw material supply apparatus and that of a submerged grinding apparatus equipped with the raw material supply apparatus.

A raw material supply apparatus 1 of the present invention comprises a tubular member 4 retained in a vertical posture, a hopper 5 in which the tubular member 4 is disposed, and quantitative discharge means 7 disposed below the tubular member 4 for sending out a solid raw material 6 by a constant amount each time. Each of FIGS. 1 and 2 shows the state of attachment of the raw material supply apparatus 1 to a submerged grinding apparatus 12 and, in these examples, the raw material supply apparatus 1 is attached to the vertical submerged grinding apparatus as connected to a raw material supply port 3 provided on the upper side of the submerged grinding apparatus. FIGS. 1 and 2 shows the same structure excepting that the quantitative discharge means have different blades. Incidentally, the submerged grinding apparatus 12 will be described later.

The hopper 5 is adapted to introduce the solid raw material 6 and a liquid raw material 8 thereinto and, similarly to an ordinary hopper, made of a material, such as metal or plastic. The hopper 5 in the present embodiment has a cylindrical shape and is provided on the lower side thereof with a funnel-shaped (inversed conical) liquid accumulation portion 5d that is provided on the central lowest end thereof with a discharge spout 5a. The liquid accumulation portion 5d is maintained in a state in which it always accumulates therein the liquid raw material 8 in a constant amount. The hopper 5 may have a structure provided with a liquid level sensor 10 for detecting the liquid level of the liquid raw material 8 within the hopper 5 (See in FIG. 4). The example of FIG. 4 has a structure in which the liquid level is maintained while discharging the liquid raw material 8 with a pump P in the case where a large amount of the liquid raw material 8 is supplied together with the solid raw material 6 and, in the case where a small amount of the liquid raw material 8 is sent together with the solid raw material 6, the liquid level is maintained while supplying the liquid raw material 8 with the pump P.

The hopper 5 is provided inside thereof with the tubular member 4. The tubular member 4 is retained in a vertical posture for supplying the solid raw material 6 as separated from an excessive amount of the liquid raw material and provided on an open upper end portion thereof with a slot for introducing the solid raw material 6 thereinto. While the tubular member has a shape having a constant inside diameter, it may have a shape increasing the inside diameter gradually downward. By the shape of the tubular member 4 having a taper that increases the inside diameter downward, the solid raw material 6 supplied thereinto can rapidly be transferred (allowed to drop) into the quantitative discharge means 7 by its own weight. In addition, the effect of preventing the raw materials from attaching to the tubular member 4 can also be expected.

Figure 7:
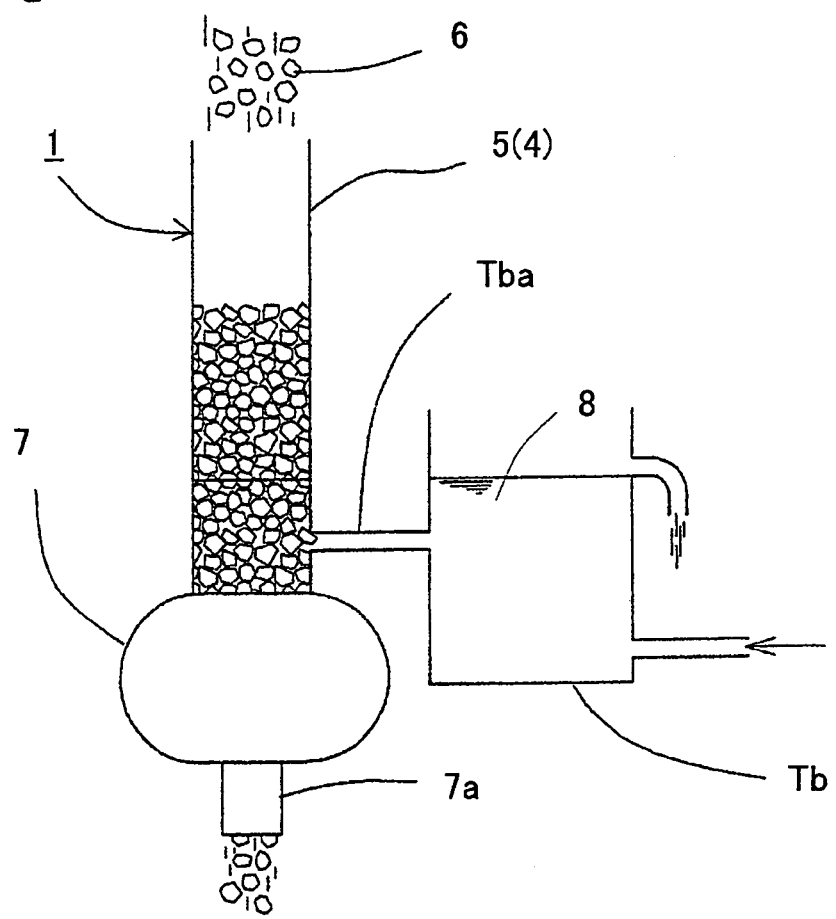
FIG. 7 is a schematic view showing seventh example of the raw material supply apparatus.

The hopper 5 may have the same shape as the tubular member 4. The hopper and porous tubular member 4 form a dual cylindrical structure. As shown in FIG. 7, however, the quantitative discharge means 7 is disposed below the hopper 5 having the constant inside diameter. The tubular member 4 may have a shape of a truncated cone, quadrangular prism, quadrangular pyramid, polygon, polygonal pyramid or rectangular cylinder, not to mention the shape having the constant inside diameter. In the example of FIG. 7, the tubular member 4 functions also as the hopper 5, and this structure has no pore. In addition, the liquid raw material 8 stored in a storage tank Tb is supplied to a position on the lower side of the hopper 5, i.e. above the quantitative discharge means 7, via a pipe Tba. Furthermore, when an excessive amount of the liquid raw material 8 is supplied together with the solid raw material, it passes through the pipe Tba and flows into the storage tank Tb and thus the liquid level of the liquid raw material 8 within the tubular member is maintained constant. In the example of FIG. 7, no particular liquid level controlling system is necessitated.

The tubular member 4 need be permeated by the liquid raw material 8 supplied from the hopper 5 and, for this reason, is preferably a porous tubular member (multihole tubular member) having a plurality of pores 4a. In this case, it is necessary for the pores 4a to prevent the solid raw material 6 from moving to the inside of the hopper 5 and to avoid clogging. In view of these, the size of the pores 4a in the tubular member 4 is preferably the same as or smaller than the minor axis of the solid raw material 6, for example, and more preferably one half or less of the minor axis. When the solid raw material 6 comprises soybeans or adzuki beans, for example, the concrete size of the pores 4a preferably has a minor axis or minimum width of around 0.1 mm to 10 mm and more preferably in the range of 2 mm to 5 mm. Incidentally, the shape of the pores 4a may be an optional hole-shape including circular, elliptical, elongate-hole and slit-aperture shapes.

The material for the tubular member 4 includes materials of metals (SUS 304 or SUS 316 stainless steel, titanium, aluminum, etc.), resins [polypropylene (PP) resin, polyethylene (PE) resin, low-density polyethylene (LDPE), high-density polyethylene (HDPE), polyvinyl chloride (PVC) resin, polyvinylidene chloride (PVDC) resin, polyethylene terephthalate (PET) resin, fluorine resin, acryl resin, methacryl resin, polyamide (PA) resin, silicone resin, epoxy resin, urethane resin, melamine-formaldehyde resin (MF), phenol-formaldehyde resin (PF), urea-formaldehyde resin (UF), ABS resin, polyacetal resin, polybutylene terephthalate resin, polyethersulphone resin, polyimide resin, polyether ketone resin, polyphenylene sulfide resin, polyether imide resin, oxybenzoyl polyester resin, polyvinyl alcohol resin, diodegradable plastics including polylactic resin], natural rubber, synthetic rubber including silicone rubber, fluorine rubber, isoprene rubber, nitrile rubber, butyl rubber, urethane rubber, chloropyrene rubber, ethylene propylene rubber, etc.; their combined materials; melt-mixed materials (fluorine+polypropylene, for example); laminate materials; FRP materials; and processed products, plate materials, film materials, sheet materials and molded-cut products of filaceous filter fabric subjected to thinning, textile, spinning or hollow fiber treatment. It may also be formed of ceramic (subjected to surface-smoothening treatment with glost), glass (including hard glass and quartz glass), wood, resinous filter fabric and mesh. In the case of the metal material, it is subjected to thinning treatment into metallic mesh, the inner surface thereof is mirror-polished, or the surface of a polished plate or solid raw material subjected to divot processing, which surface has small surface friction or rolling friction, is used as the inside surface. Incidentally, the inner surface of the material may be coated with fluorine resin having high slidability. In the case of inducing a difference in friction between the front and rear surfaces of a plate material in consequence of laser processing or punching processing, not to mention burr removal and chamfering processing, in producing the pores 4a, the surface having friction as small as possible is used as the inner surface.

Figure 4:
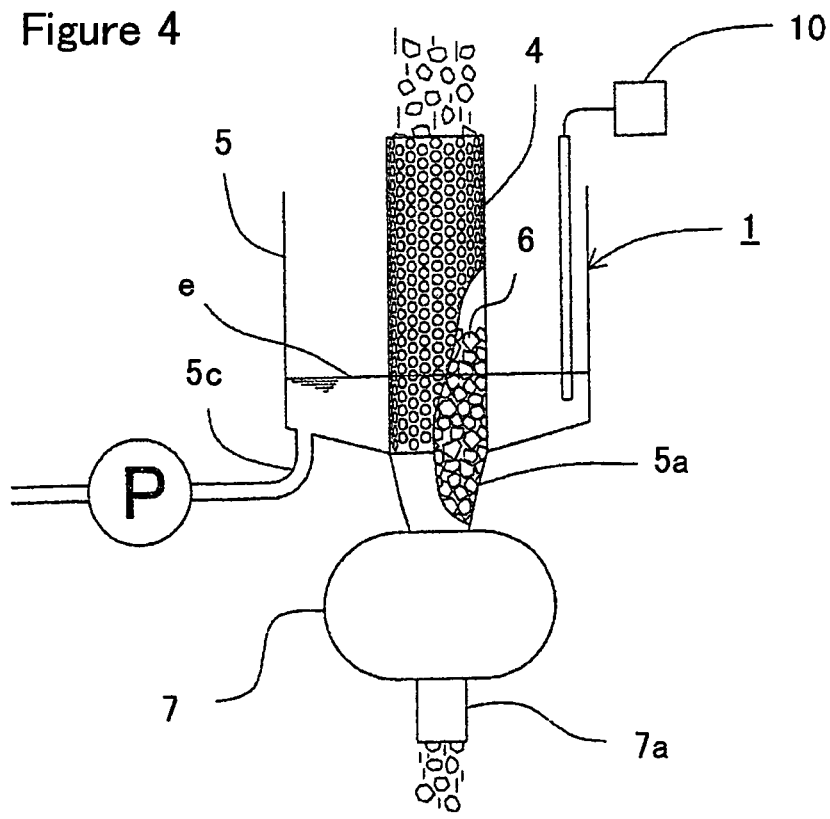
FIG. 4 is a schematic view showing fourth example of the raw material supply apparatus.

Here, in the embodiments of FIGS. 1 and 2, a second hopper Bt is disposed, and the liquid level sensor (liquid level control means) 10 for detecting the liquid level of the liquid raw material 8 within the second hopper Bt is installed. In the submerged grinding apparatus 12, submerged crushing is performed. When the liquid level of the liquid raw material 8 within the second hopper Bt is excessively low, however, there is a possibility of air being mixed in the raw materials to be supplied to the submerged grinding apparatus 12. Therefore, the liquid level sensor 10 is used to monitor the liquid level of the liquid raw material 8 to prevent the incorporation of the air. As the liquid level sensor 10, an optional sensor including a pressure sensor, magnetostrictive sensor, float sensor, ultrasonic sensor, laser sensor and radar sensor can be used. The adjustment of the liquid level is performed through input of signals of the liquid level sensor 10, for example, into a controller and ON-OFF control or PID control performed relative to a flow rate controller, such as the pump or valve disposed on a drain outlet described later. In the liquid level sensor 10 as shown in FIG. 4, a liquid level e of the liquid raw material 8 within the hopper 5 can also be controlled using a level sensor. Otherwise, a merely overflowing structure may be adopted.

The quantitative discharge means 7 is connected to the discharge spout of the tubular member 4. The quantitative discharge means 7 in the embodiment of FIG. 6 can serve also as a measuring apparatus and have a stream adjustment function. In the case of the submerged grinding system, a method capable of using a measuring device and a stream adjustment device alike is adopted. The liquid level of the liquid raw material can be controlled using any combination of methods. The amount of the solid raw material 6 supplied to the quantitative discharge means 7 is controlled with an inverter. As the quantitative discharge means 7, a self-suction quantitative pump for discharging the solid raw material little by little is preferably used. To be specific, a positive displacement pump, such as a rotary pump, MONO pump, gear pump, vane pump, MONOFLEX pump, hose pump (tubing pump) and plunger pump, is preferred.

In the measuring apparatus and stream adjustment function, the quantitative discharge means 7 can fulfill its function when it is provided with a device having a rotatable "measure" member as the aforementioned measuring apparatus and with dynamic stream adjustment means (movable) having at least one bladed wheel (having a monoaxial rotation blade, biaxial rotation blade or screw spiral blade) to fulfill the stream adjustment function.

A cylindrical discharge spout Sr is attached to the discharge side of the quantitative discharge means 7. The cylindrical discharge spout Sr is disposed so as to come into contact with the liquid level in the second hopper Bt to which the supply port 3 of the submerged grinding apparatus 12 is connected (FIGS. 1A and 1B). The cylindrical discharge spout Sr is made of silicone resin, has its lower end tapered and is made flat when no raw material is passed through it. The solid raw material containing a prescribed amount of liquid raw material is then discharged under the liquid level in the second hopper Bt. Incidentally, since the aforementioned material for the cylindrical discharge spout is swollen even when the amount of the raw material discharged from the quantitative discharge means 7 has been increased, it is possible to cope with the increase in the discharged amount.

Figure 3:
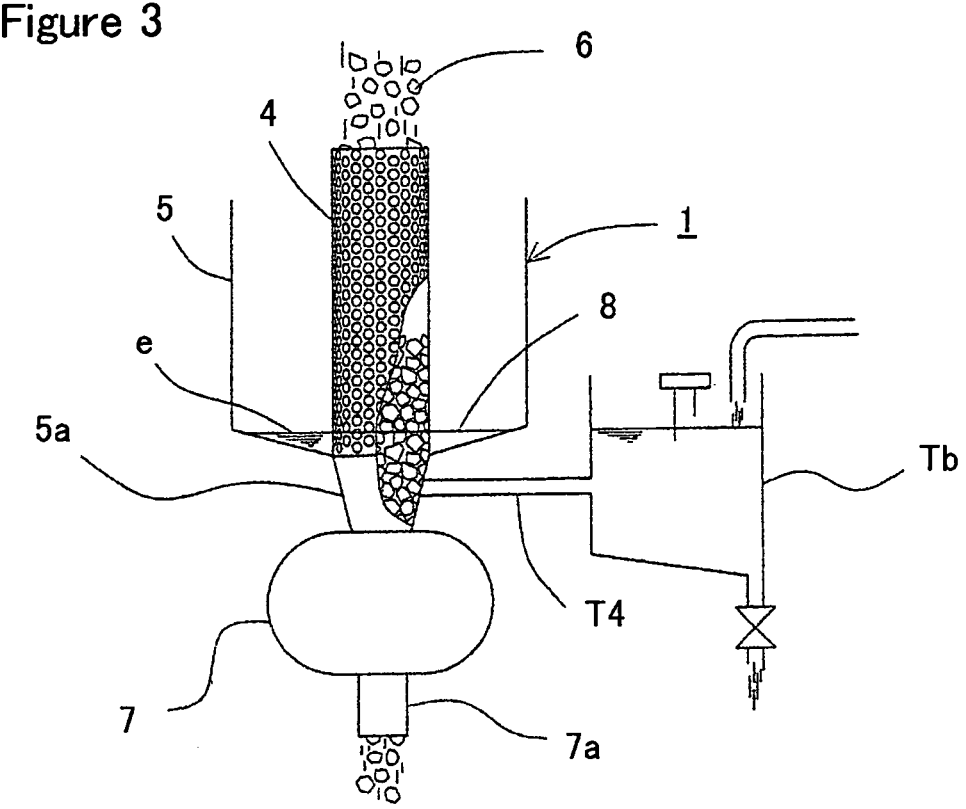
FIG. 3 is a schematic view showing third example of the raw material supply apparatus.

Here, FIGS. 3 to 8 are schematic views showing examples of the raw material supply apparatus 1. FIG. 3 shows a case where the liquid raw material 8 is supplied to the discharge spout 5a of the hopper 5 and, in this example of FIG. 3, only the solid raw material is supplied into the tubular member 4 to form a cylindrical stacked state and mixed with the liquid raw material 8 at the discharge spot 5a to which a pipe T4 is connected. By supplying the liquid raw material 8 together with the solid raw material 6, however, the effect of breaking the bridge phenomenon can be expected even when the bridge phenomenon has occurred within the tubular member 4. In the example of FIG. 3, it is unnecessary to circulate the liquid raw material all the time and, for example, the detection with the liquid level sensor is utilized to stop supplying the liquid raw material 8.

Figure 5:
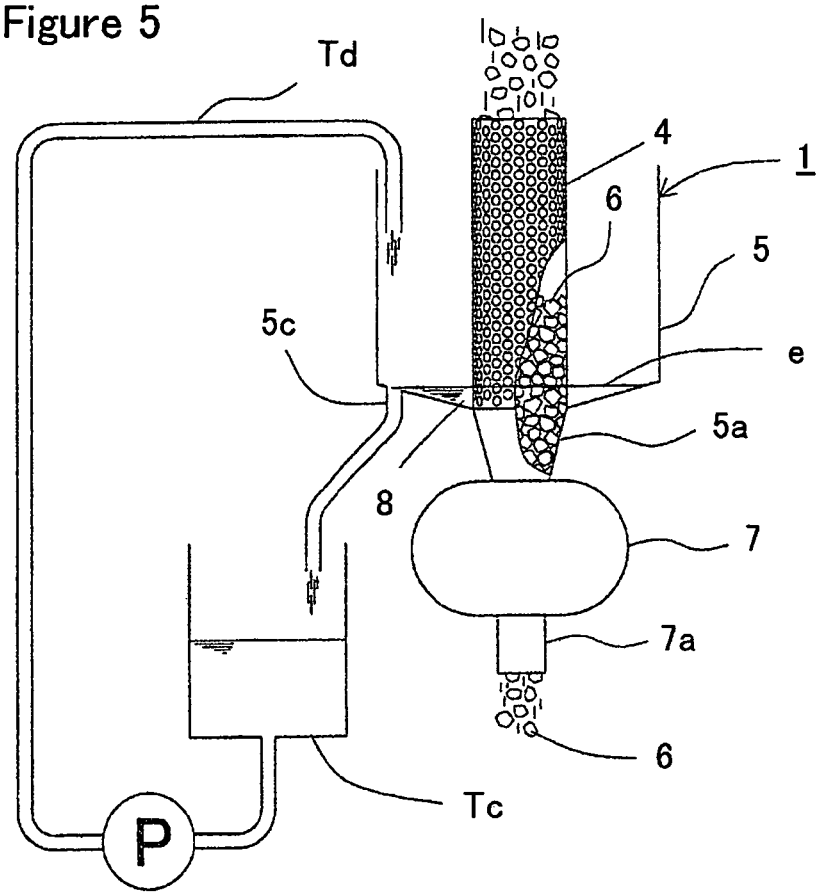
FIG. 5 is a schematic view showing fifth example of the raw material supply apparatus.

In FIG. 5, a discharge spout 5c for discharging the liquid raw material is disposed below the hopper 5, and a storage tank Tc for storing the discharged liquid raw material 8 and a supply pathway Td for supplying the stored liquid raw material 8 are provided. As a result, the liquid level in the hopper 5 can be maintained constant and, at the same time, the used liquid raw material 8 is circulated and returned again to the hopper 5 and can thus be used cyclically. In the case of supplying the liquid raw material 8 together with the solid raw material, the liquid raw material can be used without being disposed of. It can be reused at a different place, such as a crushing portion, from the storage tank Tc.

Figure 8:
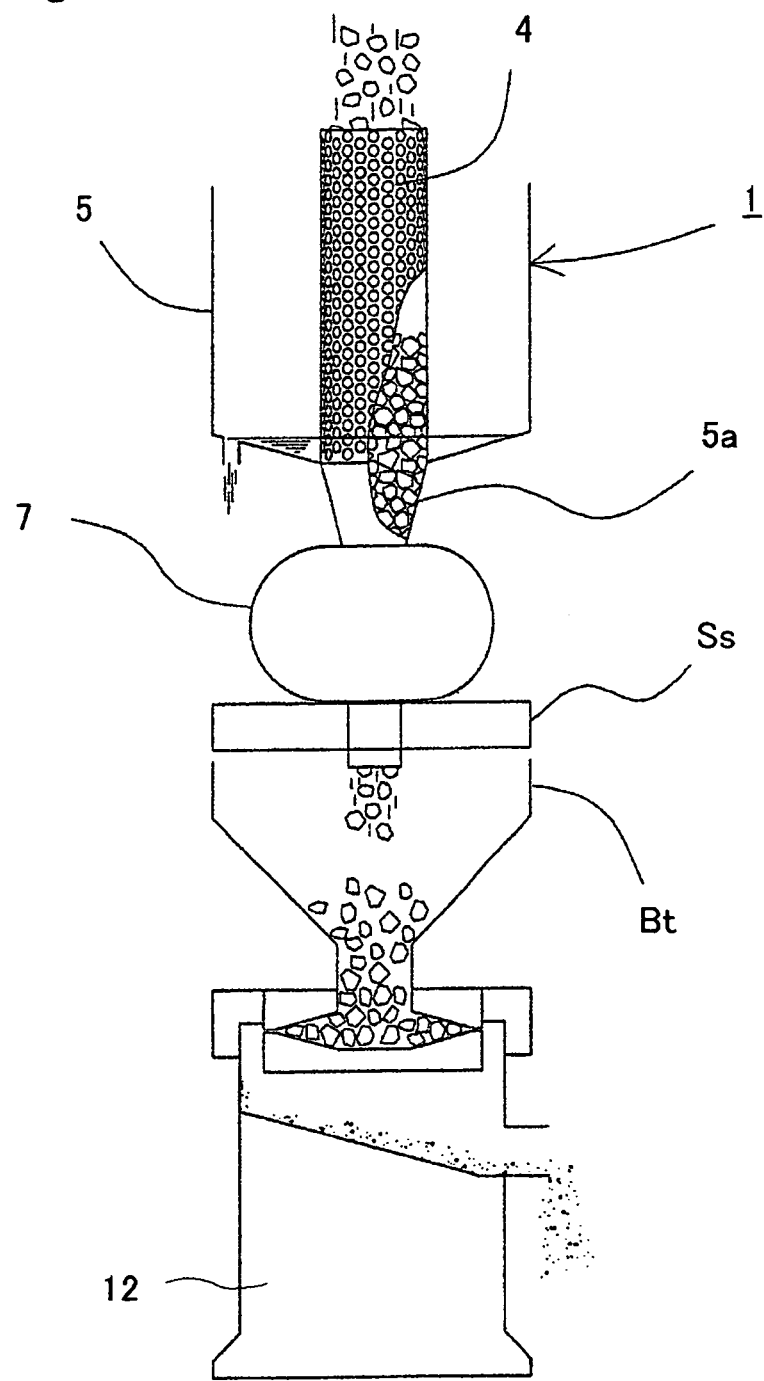
FIG. 8 is a schematic view showing eighth example of the raw material supply apparatus.

FIG. 8 shows an example having pulverizing means Ss further disposed on the discharge side of the quantitative discharge means 7. In this example, the coarsely crushed material used as the solid raw material is introduced and supplied into the tubular member 4 together with the liquid raw material 8, the solid raw material and liquid raw material are allowed to pass through the tubular member 4, then once separated from each other and solid raw material 6 is pulverized with the pulverizing means Ss. The pulverizing means Ss is disposed as close to the quantitative discharge means 7 as possible. The pulverizing means Ss is crushing means of a rotary type (e.g. stone mill type in which the shaft thereof may be shared with the rotary shaft of the grinding apparatus or driven separately from the grinding apparatus), biaxial roll type, monoaxial roll type, rotary cutter type, hammer mill type, jet mill type or monoaxial or biaxial screw extruder (mincing type). By making the numbers of revolutions different from each other (with transmission means, such as an inverter or gear transmission, belt pulley system transmission) in the case of the biaxial roll type crushing means, the crushing effect can be further enhanced.

In the example of FIG. 8, by pulverizing the solid raw material 6 in advance, the crushing load at the grinding portion of the submerged grinding apparatus 12 that will be described later can be lowered. As a result, the load current of a motor, for example, is lowered, the processing capacity of crushing the solid raw material 6 is enhanced, and the adjustment range is widened. In addition, also by increasing the number of revolutions by the decrement of the motor load, the processing capacity of crushing the solid raw material 6 can further be enhanced. Incidentally, in the example of FIG. 8, the solid raw material 6 having be pulverized with the pulverizing means Ss is received in the second hopper Bt and supplied into the submerged grinding apparatus 12. However, an ordinary grinding apparatus can also be used.

(Grinding Apparatus)

The raw material supply apparatus 1 in the present embodiment is connected to the submerged grinding apparatus 12 disposed below the raw material supply apparatus (FIGS. 1 and 2). The raw material supply apparatus is connected to the submerged grinding apparatus via the second hopper Bt that receives the solid raw material 6 discharged from the cylindrical discharge spout Sr and a quantitative pump (second quantitative pump) 9 to which the second hopper Bt. The second quantitative pump 9 can serve as a measuring apparatus and have a stream adjustment function. When performing the grinding step, the liquid level control is important. Therefore, a quantitative pump Pc is connected to the submerged grinding apparatus 12 through a discharge spout 13, thereby preventing air intrusion. Grinding water is supplied to the second hopper Bt, and the liquid level sensor 10 is disposed to detect the liquid level of the grinding water within the second hopper Bt.

The submerged grinding apparatus 12 is equipped with a grinding chamber having a grindstone (grinding portion) 11, where the solid raw material 6 is ground into slurry. In the submerged grinding apparatus 12, the interior of the grinding room has to have an airtight structure inducing no leakage, with the raw material supply port 3 and discharge spout 13, for example, blocked off. However, even a structure inducing some leakage can be applied to the present invention. The combination of the airtight structure of the submerged grinding apparatus 12 with the raw material supply apparatus 1 enables submerged grinding to be realized stably and oxidation reaction to be suppressed sufficiently.

The grinding stone 11 disposed in the grinding chamber of the submerged grinding apparatus 12 comprises a stationary grinding stone 11a and a rotatable grinding stone 11b, for example, and the solid raw material 6 is introduced from a hole formed in the center of the stationary grinding stone 11a to between the stationary grinding stone 11a and the rotatable grinding stone 11b and ground. As the stationary grinding stone 11a and rotatable grinding stone 11b, optional grinding stone, such as metal grinding stone, ceramic grinding stone, porous grinding stone, can be used. These stationary and rotatable grinding stone 11a and 11b are preferably formed of a non-permeable material so as not to allow the liquid raw material to permeate the grinding stone. This is because there is a possibility of the amounts of the solid and liquid raw materials 6 and 8 inducing imbalance due to the fact that the centrifugal force and internal pressure of the rotatable grinding stone 11b cause the liquid raw material 8 to permeate the stationary grinding stone 11a or rotatable grinding stone 11b during the grinding step in the case where the stationary or rotatable grinding stone 11a or 11b is porous, water-permeable and have a water-passing property. By forming the stationary and rotatable grinding stone 11a and 11b of the non-permeable material, it is possible to prevent the induction of the aforementioned imbalance.

Figure 6:
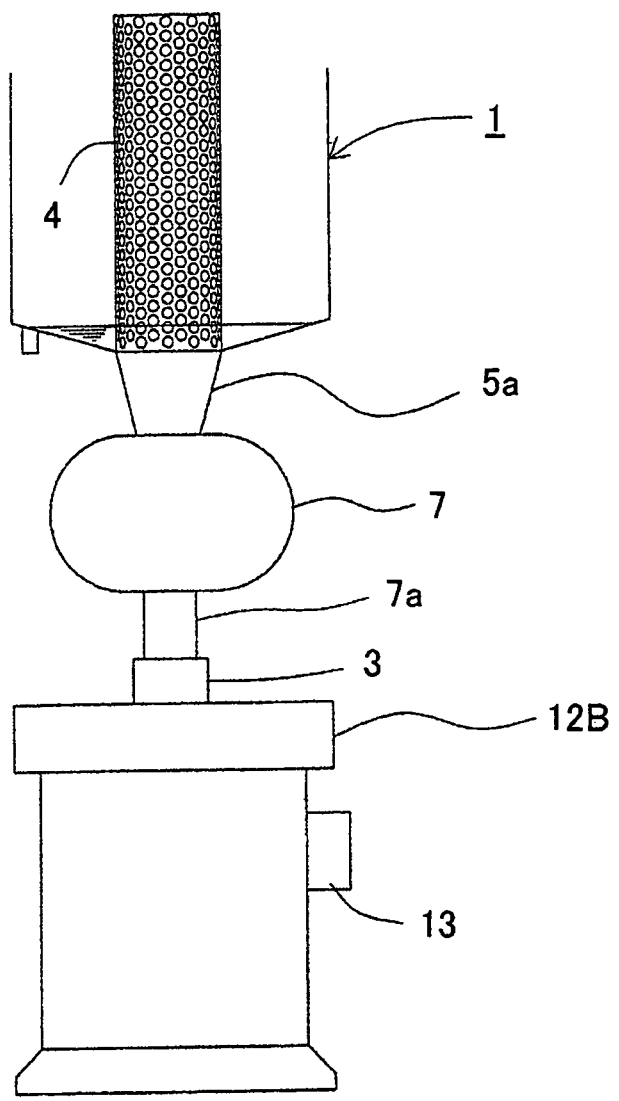
FIG. 6 is a schematic view showing sixth example of the raw material supply apparatus.

The configurations of the supply apparatus and submerged grinding apparatus according to the present invention are not limited to those described above, but may be modified variously. In the example of FIG. 6, for example, to the supply port 3 of an ordinary grinding apparatus (not the submerged grinding apparatus) 12B, a discharge spout 7a of the quantitative discharge means 7 is connected. The raw material supply apparatus 1 in the present embodiment is adapted to allow the solid raw material 6 and liquid raw material 8 to pass through the tubular member 4 and once separate the raw materials from each other and may be used as connected directly to the ordinary grinding apparatus 12B.

Next, a grinding system and raw material supply method each using the raw material supply apparatus of the present invention will be described. The raw material supply method in the present embodiment comprises introducing and supplying the solid raw material 6 together with the liquid raw material 8 into the tubular member 4 retained in a vertical posture, allowing these materials to pass through the tubular member while controlling the liquid level of the liquid raw material to be constant so as to exert the weight of the solid raw material downward, thereby sending the solid raw material to the quantitative discharge means 7 disposed below the tubular member and discharging the solid raw material.

The solid raw material 6 includes cereals (soybeans, sesame, adzuki beans, rice, wheat, barleys, seeds including corns, peanuts and coconuts), for example. It also includes those soaked, dehulled, boiled, roasted, fermented and germinated. Here, in the case where the solid raw material comprises soybeans coarsely crushed, the components thereof are mixed with the liquid raw material 8. The soybeans coarsely crushed means those divided into one half, one fourth, one eighth and one sixteenth, ground and broken, crushed and disintegrated. The solid raw material also includes natto, tempeh, malt, roasted sesame, fruits (apples, oranges, etc.), vegetables (tomatoes, cabbages, spinach), root vegetables (batatas, potatoes, konjac yams, wild yams, dasheen, carrots, radishes, etc.), seaweeds (brown seaweeds, barilla, kelp, etc.), tea-leaves, medical plants (including crude raw materials for those, those dried, those flushed with water, etc.), stored meats, chicken eggs, fish food, etc. In addition, those pulverized may be adopted. Furthermore, the solid raw material may be used for the purpose of reusing raw materials for various kinds of processed foodstuffs disposed of (okara, apple marc, broken articles including leavings and fragments of dried noodles, for example) and also for the purpose of reusing protein susceptible to oxidation, fat and fatty oil including fat and fatty oil containing unsaturated fatty acid, and remaining materials of foodstuffs containing polyphenols, pigments, vitamins, etc. Besides, the present invention is applicable to all solid raw materials like that variable in quality due to oxidation. Therefore, when the object is to suppress deterioration in quality due to oxidation, the solid raw material can be used for processing metal, resin, dyestuff, fieldstone, ore, etc. Of course, the solid raw material 6 is not limited to those described herein above.

When the solid raw material 6 is a raw material for like soybeans and rice, water, beverage, liquid oil, foodstuffs in the form of liquid, etc. are used as the liquid raw material 8. The water includes warm water, hot water, pressurized hot water, organic acids, such as malic acid, acetic acid (also including edible vinegar), citric acid, gluconic acid or aqueous acidic pH adjustment solutions containing these, aqueous alkali pH adjustment solutions, such as sodium hydroxide, sodium hydrogen carbonate (sodium bicarbonate), sodium carbonate, various kinds of salt solutions, such as sodium chloride, soft water, tap water, groundwater, alkali ion water, acid ion water, distilled water, sodium ascorbate, ascorbic acid (vitamin C), and water or aqueous solutions containing these. Beverage includes soymilk, milk and fruit juice drinks. The liquid oil includes soybean oil, canola oil and other edible oils (cooking oil, refined canola oil, processed oil). An emulsifier includes diacylglycerol in the form of liquid oil having a melting point below normal room temperature. The foodstuffs in the form of liquid include edible vinegar, soy sauce, sauce, and alcoholic beverage. In the case of using water, so-called wet grinding is adopted. The water includes cold water of 10° C. or less, hot water of 80° C. or more, and use of water deaerated, deoxidized or subjected to metal ion removal treatment (cation exchange resin treatment, anion exchange resin treatment, reverse osmotic membrane treatment) or to pH adjustment (mild acidity or alkalescent: treatment for avoiding optimum pH of oxidase) is more effective. In addition, even liquid containing mineral salt including common salt, sodium sulfate and potassium chloride is possibly effective. In a solid raw material containing plenty of water (fruits, etc., for example), the liquid raw material 8 may not daringly be used, and fruit juice oozing at a coarsely crushing step can be a substitute for the liquid raw material. In the case where the solid raw material is sesame, peanut or those roasted, use of edible oil (having a low melting point) exhibiting a liquid state at a service temperature, such as soybean oil, canola oil, sesame oil, brings about pasty kneaded sesame or peanut paste. Besides the edible material, various liquid substances can be used. As the case may be, organic compounds other than water (alcohol, such as ethanol, organic solvent, such as hexane) can also be used. The liquid raw material 8 is not limited to those described herein above, either.

Particularly, in the case of foodstuffs utilizing gelling power of protein, with soybeans or wheat as the raw material, the present embodiment is applicable to the objects of enhancing processing appropriateness (suppressing oxidation of an SH radical of protein and improving elastic force or texture), besides the objects of improving flavor, such as grassy smell, and enhancing long-term storage stability. In the case of the soybeans, what are effectively applicable are soymilk, tofu and fried bean curds. For example, in the case of soymilk, what are effectively applicable are reconstituted soymilk, soymilk beverage, soymilk jelly, soymilk ice cream, soymilk yogurt, etc. In the case of tofu, what are effectively applicable are tofu (including quick frozen products), such as silken tofu (Kinugoshi tofu), Juten tofu, Momen tofu, Yose tofu (Oboro tofu), dough (including quick frozen half-finished products), such as thick-fried tofu, tofu-cutlet, thin-fried tofu, sushi-age, tofu burger, Kori-tofu or its dough before and after being quick frozen. In the case of fried food, what are effectively applicable are fried bean curds, such as sushi-age, thick-fried tofu, tofu-cutlet, thin-fried tofu, tofu burger, etc., yuba, yuba tofu, soya protein gel-soymilk yogurt, soy milk jelly, soybean-processed foodstuffs, such as tofu pudding, etc. Particularly, in the application to the fried food, it is possible to suppress oxidation of oils and fats in products or abnormal odor generation. Soybeans as the raw material include domestic soybeans, imported soybeans, their lipoxygenase gene defect species, their dehulled soybeans, roller-crushed soybeans, raw soybean powder, separated soybean protein, concentrated soybean protein, etc. In the case of wheat, it is possible to obtain gluten rich in SH radicals and super bread flour and the wheat can be used in producing strongly chewy noodles, raw gluten, etc. Incidentally, it goes without saying that the target foodstuffs in the present invention are not limited to those described herein above.

The solid raw material 6 and liquid raw material 8 stored in the storage tank are introduced from the storage tank into the tubular member 4 of the raw material supply apparatus 1, the solid raw material 6 forms a columnar body in the tubular member and, by its own weight, drops from the discharge spout 5a into the quantitative discharge means 7. On the other hand, the liquid raw material 8 within the hopper 5 passes the tubular member 4 and is discharged out of the pores 4a of the tubular member 4. The solid raw material 6 and liquid raw material 8 that have been introduced and supplied into the tubular member 4, the solid raw material forms the columnar body together with the liquid raw material to exert the weight of the solid raw material is exerted downward. The supply of the solid raw material 6 by its own weight becomes smoother than the supply thereof by insertion under pressure. For this reason, the solid raw material 6 is pushed with an appropriate force into the quantitative discharge means disposed below the tubular member and, when having been supplied to the quantitative discharge means 7, it is always sent out by a constant amount each time from the quantitative discharge means 7. On the other hand, the liquid raw material 8 is discharged out of the pores 4a of the tubular member 4 and, when the amount thereof exceeds a constant amount, stored in a storage tank Tq from the discharge spout 5c of the hopper 5. The liquid raw material stored is returned to the hopper 5 via a supply pathway T2. It is configured that the liquid having the components mixed with water, like the soaked soybeans crushed, can be returned to the hopper 5. In addition, a pathway T3 via which the liquid is supplied from the storage tank Tq into the grinding apparatus 12 is provided, and it is configured that the liquid having the components mixed with water, like the soaked soybeans crushed, can be returned to the hopper 5.

The solid raw material 6 is ground at the grinding portion, i.e. between the stationary grinding stone 11a and the rotatable grinding stone within the submerged grinding apparatus 12 into slurry that is then discharged from the discharge spout 13 with the quantitative pump Pc.

(Grinding System S1)

Figure 9:
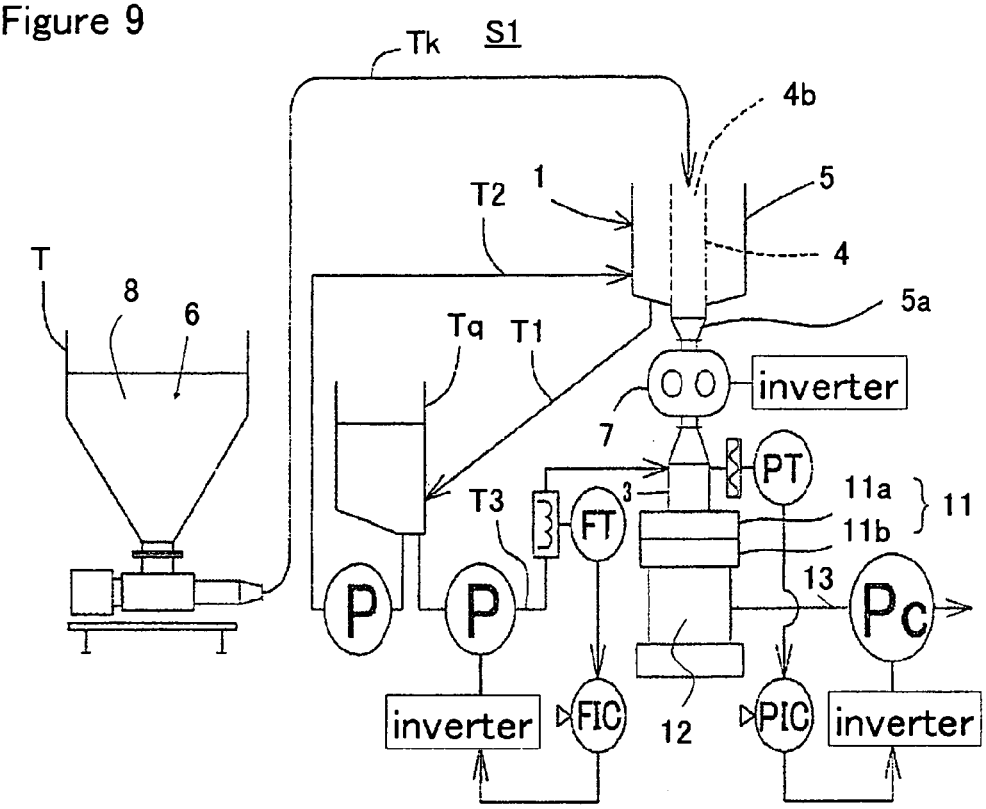
FIG. 9 is a schematic view showing first example of a grinding system using the raw material supply apparatus according to the present invention.

FIG. 9 shows the first example of a grinding system S1 using the raw material supply apparatus 1. As described in the foregoing, the raw material supply apparatus 1 and submerged grinding apparatus 12 are the same in configuration as those shown in FIG. 1, the raw material supply apparatus 1 is provided with the tubular member 4 and hopper 5, and the submerged grinding apparatus 12 is provided with the stationary grinding stone 11a and rotatable grinding stone 11b. In addition, a storage tank T for supplying the raw materials 6 and 8 into the raw material supply apparatus 1 is disposed, and the raw materials are supplied to the raw material supply apparatus 1 via a supply pathway Tk.

The liquid raw material 8 is discharged from the pores 4a of the tubular member 4 and, when the amount thereof discharged exceeds a constant amount, stored in the storage tank Tq from the discharge spout 5c of the hopper 5. The liquid raw material stored is returned to the hopper 5 through the supply pathway T2 and supplied to the grinding apparatus 12 through the pathway T3. The pathway T3 is provided with a flow meter FT and, on the basis of calculation results in a controller FIC, the liquid raw material is controlled so as to obtain an appropriate number of revolutions of the pump and supplied to the submerged grinding apparatus 12.

The quantitative discharge means 7 in the raw material supply apparatus 1 uses a positive displacement pump for measurement and stream adjustment control functions, and the quantitative pump (third quantitative pump) Pc at the discharge spout 13 of the submerged grinding apparatus 12 is a positive displacement pump. Since influence is exerted to the pressure of the portion sandwiched between the two pumps, the pressure in the zone sandwiched between the two quantitative pumps 7 and Pc is detected with a pressure transmitter (PT), and the number of revolutions of the quantitative pump Pc at the exit of a grinding machine is controlled with a pressure control apparatus (PIC) so that the pressure in the zone may be constant. In addition, a constant amount of the grinding water has to be supplied in order to make the concentration of the output product at the discharge spout 13 constant, and the liquid raw material stored in the storage tank Tq and then controlled in flow rate in the supply pathway T3 is supplied to the submerged grinding apparatus 12 via the supply pathway T3. In the example of FIG. 9, since the solid raw material 6 discharged from the quantitative discharge means 7 is sent together with the liquid raw material 8 to the submerged grinding apparatus 12, there is no fear of bubbling and, at the same time, since the quantitative discharge means 7 serves also as the stream adjustment apparatus and measuring apparatus, the cost is advantageously decreased.

Here, as means for controlling the height of the liquid level e of the liquid raw material 8 in the raw material supply apparatus 1 (liquid level control means), besides the liquid level sensor 10, a circulation structure comprising a discharge pathway T1 for discharging the liquid raw material 8, the storage tank Tq for storing the discharged liquid raw material 8 and the supply pathway T2 for supplying the stored liquid raw material can be cited, with which the amount of the liquid raw material 8 to be supplied can be controlled. According to the circulation structure, the liquid raw material 8 having the components of the solid raw material 6 dissolved out can be reused.

Figure 10:
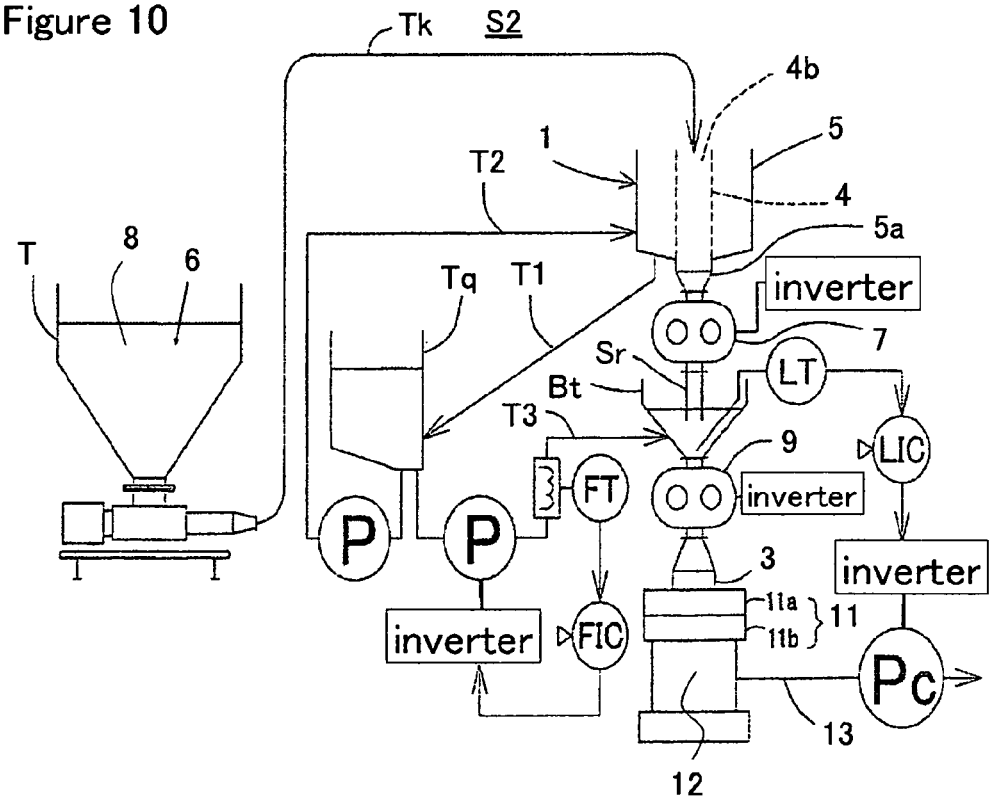
FIG. 10 is a schematic view showing second example of the grinding system using the raw material supply apparatus according to the present invention.

FIG. 10 shows the second example of a grinding system S2. In the grinding system S2 in this example, the tapered cylindrical discharge spout Sr is disposed at the discharge spout 7a of the quantitative discharge means 7 so that the distal end of the cylindrical discharge spout Sr may come into contact with the liquid level within the second hopper Bt (FIG. 1B). That is to say, based on the liquid level of the liquid raw material 8 detected with the liquid level sensor 10 disposed at the second hopper Bt, the number of revolutions (flow rate) of the quantitative pump Pc on the discharge side is controlled with a controller LIC and inverter to maintain the liquid level of the liquid raw material 8 within the second hopper Bt. Therefore, by adjusting the discharge amount by the quantitative pump Pc on the discharge side in conjunction with the liquid level within the second hopper Bt, it is prevented to make the liquid level within the second hopper Bt too lower or inversely allow the liquid raw material to overflow from the hopper 5 due to the fact that the discharge amount by the quantitative pump Pc is made too large or too small. In the grinding system S2 of FIG. 10, bubbling can be induced at the second hopper Bt in comparison with the grinding system S1. However, the bubbling is suppressed in the presence of the tapered cylindrical discharge spout Sr made of silicone resin. In addition, no adverse effect is given to other control systems because the rotation of the quantitative discharge 7 having the metering zone is independent of the quantitative pump 9 on the side of the grinding apparatus. That is to say, only by controlling the rotation of the pump Pc at the discharge spout 13 of the submerged grinding apparatus 12 so as to maintain the liquid level within the hopper into which prescribed amounts of soybeans and water have been introduced, the control system becomes very stable.

The invention claimed is:

1. A raw material supply apparatus, comprising:
   a hopper having a discharge spout protruding downward;
   a porous tubular member arranged at the discharge spout of the hopper, and having a water-passing property or a liquid permeability;
   a first quantitative discharge device disposed below the tubular member in a vertical posture for sending out a constant amount of a solid raw material and a liquid raw material, and having a discharge port;
   a grinding apparatus disposed below the first quantitative discharge device, and having a supply port connected to the discharge port of the first quantitative discharge device;
   an effluent pathway for discharging the liquid raw material from the hopper;
   a storage tank connected to the effluent pathway for storing the discharged liquid raw material; and
   a supply pathway connected to the storage tank for supplying the liquid raw material stored in the storage tank to the hopper;
   wherein the tubular member in the vertical posture is arranged to supply the solid raw material and the liquid raw material so that the solid raw material is gathered in a columnar shape, while the liquid raw material is discharged to the hopper to quantitatively discharge the solid raw material to the first quantitative discharge device.

2. A raw material supply apparatus according to claim 1, wherein the tubular member is disposed inside the hopper to receive the solid raw material and liquid raw material so that the solid raw material is sent to the first quantitative discharge device while a level of the liquid raw material is controlled to quantitatively discharge the solid raw material.

3. A raw material supply apparatus according to claim 1, wherein the discharge port of the first quantitative discharge device is made of a flexible material.

4. A raw material supply apparatus according to claim 1, further comprising a pulverizing device for crushing the solid raw material and provided in continuity with the first quantitative discharge device and connected to the grinding apparatus.

5. A raw material supply apparatus according to claim 1, wherein the first quantitative discharge device comprises a flow rate controlling device for sending out the constant amount of the solid raw material containing the liquid raw material, and a level control device for detecting or controlling a level of the liquid raw material.

6. A raw material supply apparatus according to claim 1, wherein the effluent pathway is connected to the discharge spout of the hopper to supply the liquid raw material stored in the storage tank.

7. A raw material supply apparatus according to claim 1, further comprising:
   a second quantitative discharge device disposed at a discharge port of the grinding apparatus; and
   a pressure control device disposed in a section between the first and second quantitative discharge device to maintain a predetermined pressure.

8. A raw material supply apparatus according to claim 1, further comprising:
   another supply pathway for supplying the liquid raw material stored in the storage tank to the supply port of the grinding apparatus.

9. A raw material supply apparatus, comprising:
   a first hopper having a discharge spout protruding downward;
   a porous tubular member arranged at the discharge spout of the first hopper, and having a water-passing property or a liquid permeability;
   a first quantitative discharge device disposed below the tubular member in a vertical posture for sending out a constant amount of a solid raw material and a liquid raw material;
   a second hopper disposed below the first quantitative discharge device;
   a second quantitative discharge device disposed below the second hopper for sending out a constant amount of the solid raw material, and having a discharge port;
   a grinding apparatus disposed below the second quantitative discharge device, and having a supply port connected to the discharge port of the second quantitative discharge device;
   an effluent pathway for discharging the liquid raw material from the first hopper;
   a storage tank connected to the effluent pathway for storing the discharged liquid raw material; and
   a supply pathway connected to the storage tank for supplying the liquid raw material stored in the storage tank to the first hopper;
   wherein the tubular member in the vertical posture is supplied with the solid raw material and the liquid raw material so that the solid raw material is formed in a columnar shape while the liquid raw material is discharged to the first hopper to quantitatively discharge the solid raw material to the first quantitative discharge device.

10. A raw material supply apparatus according to claim 9, further comprising another supplying path for supplying the liquid raw material stored in the storage tank to the second hopper.

11. A raw material supply apparatus according to claim 9, wherein the second quantitative discharge device comprises a flow rate controlling device for sending out the constant amount of the solid raw material and the liquid raw material, and a level control device for detecting or controlling a level of the liquid raw material.

* * * * *